United States Patent Office 3,784,639
Patented Jan. 8, 1974

3,784,639
DISPROPORTIONATION OF ALKALI METAL
SALTS OF AROMATIC CARBOXYLIC ACIDS
Donald K. Kuper, Bartlesville, Okla., assignor to
Phillips Petroleum Company
No Drawing. Filed July 19, 1971, Ser. No. 164,099
The portion of the term of the patent subsequent to
Feb. 8, 1989, has been disclaimed
Int. Cl. C07c 63/26
U.S. Cl. 260—515 P                                       9 Claims

ABSTRACT OF THE DISCLOSURE

A slurry comprised of an alkali metal salt of an aromatic carboxylic acid, a disproportionation catalyst, an aryloxy compound and an inert high-boiling organic dispersant is subjected to heating at an elevated temperature in the presence of a compatible gas atmosphere to form a polycarboxylate having at least one additional carboxyl group.

This invention relates to the production of aromatic carboxylic acids from aromatic polycarboxylates. This invention further relates to the production of aromatic polycarboxylates by disproportionation of alkali metal salts of aromatic carboxylic acids.

BACKGROUND OF THE INVENTION

It is well known in the art that alkali metal salts of carboxylic acids having carboxyl groups which are attached to aromatic ring systems can be converted, i.e., transformed, into salts of different carboxylic acids having at least two carboxyl groups in the molecule by heating the said alkali metal salts to elevated temperatures in the presence of a protective gas. It is also known that this transformation is a solid state reaction, that is, the alkali metal salt is heated in the solid state to produce the transformation, called disproportionation, with the product also being in the solid state.

This solid state reaction has caused considerable difficulties in the art with respect to its being used in commercial operations. These difficulties include low heat transfer in the reactor and difficulty in the transporting and in the mixing of the reactants and reaction products. In addition, during the solid state reaction the solids fuse together to form large solids, herein referred to as "clinkers," which are extremely difficult, if not impossible, to handle, which foul the reactor causing process interruptions, and which present problems in separation and recovery of the product. Still another difficulty with this reaction has been in the selection and use of suitable disproportionation catalysts. One group of highly useful catalysts has been the aromatic acid salts of zinc, mercury, cadmium, lead and iron, and particularly the benzoic acid salts thereof. These salts, however, during the disproportionation reaction are converted to the corresponding metal oxides and must be regenerated to the salt form prior to reuse in the reactor. The regeneration requirement, of course, leads to further complications in the commercial utilization of the reaction.

THE INVENTION

It is thus an object of this invention to provide an improved process for the disproportionation of carboxylic acid salts.

Another object of this invention is to provide a process wherein the disproportionation of carboxylic acid salts is conducted in a fluid medium.

Still another object of this invention is to provide a disproportionation process having an improved catalyst system therein.

Other aspects, objects and the several advantages of this invention will be apparent to one skilled in the art from the following specification and appended claims.

In accordance with this invention, I have discovered that the process for conversion of an alkali metal salt of an aromatic carboxylic acid to an aromatic polycarboxylate is improved by conducting the process in a slurry system in the presence of an aryloxy compound adjuvant and a metal oxide as catalyst. More precisely, in accordance with this invention the solid reactants, catalyst, and adjuvant are dispersed in an inert organic dispersant to form a slurry which is thereafter subjected to the known disproportionation conditions. The slurry provides improved handling, mixing and heat transfer properties. Also, the solid product is not in a fused form but is instead carried as finely-divided particles in the organic dispersant from which the product can be conveniently removed. In addition, the metal oxide catalyst is not affected by the disproportionation reaction and after the product is removed from the organic dispersant the catalyst which remains in the dispersant is returned to the reactor without need of regeneration.

There is thus provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst, an aryloxy adjuvant and an inert high-boiling organic dispersant is subjected to heating at an elevated temperature in the presence of a compatible gas atmosphere to thus form the desired polycarboxylate product.

The disproportionation reaction is catalyzed by an oxide of a metal selected from the group consisting of iron, lead, zinc, mercury, and cadmium with the preferred catalyst being zinc oxide. The metal oxides useful herein are not expensive; they are not affected by the reaction and they can be conveniently recovered from the reactor effluent in the same form as originally charged to the reactor and then recycled directly to the reactor without need of a catalyst regeneration step. The metal oxide catalysts in accordance with my invention are used in conjunction with certain hereinafter-described aryloxy compounds as adjuvants which, surprisingly, substantially increase the catalytic effectiveness of the metal oxides.

The amount of catalyst used can vary within wide limits and can range from 0.1 to 100 grams of catalyst per mol of aromatic carboxylate employed, more preferably in the range of 1 to 50 grams per mol. The catalysts can be especially finely divided throughout the reaction mixture by transforming an aqueous solution of the salts serving as the starting materials, which contain the catalysts dissolved or suspended therein, into a dry powder by spray-drying or by other suitable methods. The above-named catalysts can also be used in conjunction with known carriers such as kieselguhr. The catalysts may be used as such or supported on carriers, and may be recovered from the insoluble residues of the reaction and reused in many instances without further purification.

The aryloxy compound, useful as an adjuvant herein, is represented by the general formula Ar—O—Y wherein Ar is an aryl or an alkaryl group having in the range of 6 to 20 carbon atoms and Y is a Group I–A metal, i.e., sodium, lithium, potassium, rubidium, and cesium (preferably potassium), or an alkyl, cycloalkyl, or aralkyl group having in the range of 1 to 10 carbon atoms. Examples of suitable aryloxy adjuvants include potassium phenoxide, rubidium 4-phenylphenoxide, sodium 2-naphthoxide, cesium 4-(4′-ethylbiphenyleneyl)phenoxide, anisole, n-hexyl phenyl ether, benzyl phenyl ether, biphenylyl 4-tert-butylcyclohexyl ether.

The aryloxy compounds can be employed in amounts ranging from about 0.01–100 g. of such aryloxy compounds per mol of alkali metal aromatic carboxylate, preferably in the range of 0.05–50 g. per mol.

The organic dispersant useful herein is one which will not decompose under the conditions of the process, which is inert to the reactants, and which is relatively high boiling. Such organic dispersants include aromatic hydrocarbons selected from the group consisting of polyaromatic compounds having three or more aromatic rings, polynuclear aromatics and mixtures thereof. Examples of such organic dispersants include terphenyls, quaterphenyls, quinquephenyls and heavier polyphenyls; binapthyls, naphthalene, anthracene, phenanthrene, pyrene, triphenylene, chrysene, perylene, pentacene and mixtures thereof.

It is desirable that the organic dispersant remain in the liquid state throughout the process; thus the compound should have a melting point below about 150° C. Mixtures of two or more of the compounds can be utilized to reduce the melting point of the dispersant. It is also desirable that the dispersant have a relatively high boiling point, for example above about 250° C., in order to aid in maintaining the reaction pressure at a low level.

The organic dispersant is present in the slurry in an amount in the range of from 25 to 80 percent by weight of the total weight of the slurry and preferably in an amount in the range of from 60 to 75 percent by weight of the total weight of the slurry.

The slurry is formed by mixing the organic dispersant with the catalyst, the aryloxy compound and the alkali metal salt of the aromatic carboxylic acid desired to be transformed. Any conventional method of mixing a solid with a liquid can be used to form the slurry. For example, if a batch reactor is employed, the dispersant, in liquid form, is added to the reactor, and then the solid salt to be converted, such as potassium benzoate, a disproportionation catalyst, such as zinc oxide, both preferably in finely divided form, and the aryloxy compound, such as anisole, are added to the reactor while the liquid is being stirred. If a continuous reactor is employed, the ingredients are metered into a separate stirred mix tank which contains the liquid dispersant wherein the slurry is formed and the slurry is then introduced into the reactor. After mixing, the process proceeds according to the well-known disproportionation process. Thus, the slurry, comprised of an alkali metal salt of an aromatic carboxylic acid, a disproportionation catalyst, and an aryloxy compound is subjected to heating in a compatible gas atmosphere in order to effect the conversion of the alkali metal salt to the desired aromatic polycarboxylate.

In a preferred embodiment, the alkali metal salt of the aromatic carboxylic acid is potassium benzoate, the disproportionation catalyst is zinc oxide, the aryloxy adjuvant is anisole or potassium phenoxide, and the reaction product is dipotassium terephthalate. In addition, in the preferred embodiment, the compatible gas is carbon dioxide. Potassium cyanate, which serves as a promoter for the disproportionation reaction, may also be added but is not required.

In a broader aspect of this invention, as starting materials for the process of this invention, in addition to the presently preferred alkali metal salts of benzoic acid, the salts of other aromatic mono- or polycarboxylic acids can be used. Such salts are those of the formula

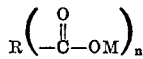

wherein R is an aromatic or alkyl aromatic group having 6 to 15 carbon atoms therein, M is an alkali metal such as lithium, sodium, potassium, rubidium and cesium, and $n$ is the integer 1, 2 or 3. Such salts are readily prepared from the corresponding acids. Such acids include, for example, benzoic acid, 2-naphthalene carboxylic acid, 4-biphenyl carboxylic acid, 2,6-naphthalene dicarboxylic acid, phthalic acid, isophthalic acid, terephthalic acid, 2-anthracene carboxylic acid, 1,5-anthracene dicarboxylic acid, 1,5,9-anthracene tricarboxylic acid, 3-phenanthrene carboxylic acid, 2,3,4-trimethylbenzene carboxylic acid, 2,4,6-trimethylbenzene 1,3-dicarboxylic acid, 2-ethyl-4-hexyl-6-methylbenzene 1,3-dicarboxylic acid, 2,4-dibutylbenzene, 1,3,5-tricarboxylic acid, and the like.

In all of the above-mentioned carboxylic acid salts the aromatic ring may carry alkyl radicals, in addition to the carboxylate groups, provided that these alkyl radical substituents do not bring about a decomposition of the molecule at temperatures equal to or lower than the reaction temperature.

When aromatic monocarboxylic acid salts are used as starting materials for the process according to the invention, the reaction products obtained thereby are industrially valuable alkali metal salts of dicarboxylic acids which can be readily converted to the corresponding dicarboxylic acids, i.e., for example, dipotassium terephthalate is readily converted to terephthalic acid.

The conversion of the alkali metal carboxylate is effected substantially completely in the absence of oxygen or water. In general, temperatures in the range of about 300 to 500° C. are employed, and more preferably in the range of 400 to 500° C.

The process of this invention can be carried out in a compatible gas atmosphere. Examples of such gases include nitrogen, carbon dioxide, methane, argon, carbon monoxide, neon, butane, ethane, helium and the like. In the preferred embodiment of the invention there is utilized an atmosphere which contains only carbon dioxide. In addition, carbon monoxide or a mixture of CO and $CO_2$ can be used in carrying out the process of the invention.

Pressures in the range of 0 p.s.i.g. to 10,000 p.s.i.g. or more can be employed, but it is advantageous and preferable, in keeping with one embodiment of the instant invention, that lower pressures in the range of 500 to 5000 p.s.i.g. be employed.

Sufficient reaction time should be employed to effect the desired degree of conversion. Generally, reaction times in the range of about 1 second to about 48 hours, preferably 5 seconds to 2 hours, are suitable.

In addition, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid are preferably employed in the form of their potassium salts, provided they form salts with alkali metals. In many cases cases the use of potassium cyanate offers special advantages.

The aromatic polycarboxylates which are produced according to the process of this invention can be removed from the reaction effluent slurry by any means known to the art. An especially attractive means of recovery, however, is as follows: The aromatic polycarboxylates can be recovered from the reaction effluent slurry by adding water to the slurry followed by agitation and settling. The water, being substantially completely immiscible with the organic dispersant, separates as a separate liquid phase carrying with it in solution the water-soluble aromatic polycarboxylates. The organic dispersant phase contains the catalyst particles and is easily removed from the water phase by conventional phase separation techniques, such as by decantation. With the catalyst being in the organic dispersant, in the form of a slurry, the slurry can be directly recycled to the disproportionation reaction without any intervening processing steps. Any catalyst carried over in the water phase can be easily removed from the solution, such as by filtration, and the catalyst, after drying, can be added directly to the reactor mass.

When the particular adjuvant selected for use is one wherein the "Y" feature of the formula Ar—O—Y is one of the previously defined alkyl, cycloalkyl, and aralkyl groups, the adjuvant then also is carried in the organic phase with the catalyst after the product removal. Thus, an additional efficiency is achieved if the adjuvant employed is one which is not soluble in the water used to recover the water-soluble product. In this regard the preferred adjuvant is anisole.

The following examples will enable persons skilled in the art to better understand and practice the invention. However, the examples are not intended to limit the scope of this invention.

Example I (a control run)

Potassium benzoate (3.0 g.) and zinc oxide (0.15 g.) were ground to an intimate mixture and dried at 150° C. for one hour. This mixture was combined with Santowax R (6.0 g., Santowax R is a mixture of terphenyl isomers and is described in Monsanto Technical Bulletin No. PL-323 revised 1959) in a 30 ml. stainless steel reactor. The reactor was closed, purged of air with carbon dioxide, pressured to 200 p.s.i.g. carbon dioxide and placed in an oven that was preheated to 441° C. for a total of 2.5 hours at autogeneous pressure. The product mixture was analyzed for product dipotassium terephthalate and unreacted potassium benzoate and found to represent a 27 weight percent conversion of potassium benzoate and a 31 percent selectivity to dipotassium terephthalate.

Example II

In the procedure of Example I, anisole was added following Santowax R and prior to closing the reactor. The results of several such runs are tabulated below.

TABLE I

| Potassium benzoate, g. | Zinc oxide, g. | Santowax R, g. | Anisole, g. | Conversion of $C_6H_5COOK$, percent | Selectivity to $p-C_6H_4(COOK)_2$, percent |
|---|---|---|---|---|---|
| 3.0 | 0.15 | 6.0 | 0.15 | 62 | 44 |
| 3.0 | 0.15 | 6.0 | 0.05 | 61 | 56 |
| 3.0 | 0.15 | 6.0 | 0.02 | 80 | 80 |

Example III

In the procedure of Example I, the drying period for the salt/oxide mixture was shortened to 0.5 hour and potassium phenoxide was added following Santowax R and prior to closing the autoclave. The results of several such runs are tabulated below.

TABLE II

| Potassium benzoate, g. | Zinc oxide, g. | Santowax R, g. | Potassium phenoxide, g. | Conversion of $C_6H_5COOK$, percent | Selectivity to $p-C_6H_4(COOK)_2$, percent |
|---|---|---|---|---|---|
| 3.0 | 0.15 | 6.0 | 0.02 | 72 | 68 |
| 3.0 | 0.15 | 6.0 | 0.05 | 69 | 69 |
| 3.0 | 0.15 | 6.0 | 0.05 | 79 | 65 |
| 3.0 | 0.15 | 6.0 | 0.10 | 80 | 76 |
| 3.0 | 0.15 | 6.0 | 0.10 | 79 | 79 |
| 3.0 | 0.15 | 6.0 | 0.20 | 81 | 75 |

A comparison of Example I, the control run in which no aryloxy adjuvant was employed, with Examples II and III, illustrative of the invention, clearly shows the improvement in conversion and selectivity (and therefore in yield) obtained in accordance with my invention.

That which is claimed is:

1. In a disproportionation process for the conversion of an alkali metal salt of an aromatic carboxylic acid to an aromatic polycarboxylate containing at least one additional carboxyl group comprising dispersing said alkali metal salt and a disproportionation catalyst in an organic dispersant to form a slurry and thereafter heating said slurry in a gas atmosphere to form said aromatic polycarboxylate, the improvement wherein there is also included in said slurry an aryloxy compound having the general formula Ar—O—Y wherein Ar is one of an aryl and alkaryl group having 6 to 20 carbon atoms and Y is selected from the group consisting of Group I-A metals, and alkyl, cycloalkyl and aralkyl groups having 1 to 10 carbon atoms and further wherein said disproportionation catalyst is an oxide of a metal selected from the group consisting of iron, lead, zinc, mercury and cadmium.

2. The process of claim 1 wherein the ratio of said aryloxy compound to said alkali metal salt in said slurry is in the range of 0.01 to 100 grams of said aryloxy compound per mol of said alkali metal salt.

3. The process of claim 2 wherein said catalyst is zinc oxide.

4. The process of claim 3 wherein said alkali metal salt is potassium benzoate.

5. The process of claim 4 wherein said dispersant is an aromatic hydrocarbon selected from the group consisting of polyaromatic compounds having three or more aromatic rings, polynuclear aromatics, and mixtures thereof.

6. The process of claim 5 wherein said dispersant is terphenyl.

7. The process of claim 6 wherein said gas is carbon dioxide.

8. The process of claim 7 wherein said aryloxy compound is anisole.

9. The process of claim 7 wherein said aryloxy compound is potassium phenoxide.

References Cited

UNITED STATES PATENTS 3,641,130   2/1972   Kuper _____ 260—515
3,042,717   7/1962   Schenk _____ 260—515

JAMES A. PATTEN, Primary Examiner